(12) United States Patent
Faruque et al.

(10) Patent No.: US 11,505,155 B1
(45) Date of Patent: Nov. 22, 2022

(54) OVERHEAD SEAT-MOUNTED AIRBAG

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/242,629

(22) Filed: Apr. 28, 2021

(51) Int. Cl.
*B60R 21/207* (2006.01)
*B60R 21/2338* (2011.01)
*B60R 21/233* (2006.01)

(52) U.S. Cl.
CPC .......... *B60R 21/207* (2013.01); *B60R 21/233* (2013.01); *B60R 21/2338* (2013.01); *B60R 2021/23324* (2013.01); *B60R 2021/23386* (2013.01)

(58) Field of Classification Search
CPC . B60R 21/207; B60R 21/233; B60R 21/2338; B60R 2021/23324; B60R 2021/23386
See application file for complete search history.

(56) References Cited

U.S. PATENT DOCUMENTS

| | | | |
|---|---|---|---|
| 6,572,137 B2* | 6/2003 | Bossecker | B60R 21/207 297/216.12 |
| 9,132,798 B2* | 9/2015 | Yasuoka | B60R 21/231 |
| 9,428,138 B2* | 8/2016 | Farooq | B60R 21/216 |
| 9,533,651 B1* | 1/2017 | Ohno | B60N 2/914 |
| 9,573,553 B2* | 2/2017 | Ko | B60R 21/13 |
| 10,112,570 B2 | 10/2018 | Barbat et al. | |
| 10,471,920 B2* | 11/2019 | Dry | B60R 21/2165 |
| 10,632,958 B2 | 4/2020 | Dry et al. | |
| 10,926,733 B2* | 2/2021 | Dry | B60R 21/23138 |
| 2018/0043852 A1* | 2/2018 | Fischer | B60R 21/231 |
| 2018/0222432 A1* | 8/2018 | Schneider | B60R 21/262 |
| 2019/0031132 A1* | 1/2019 | Dry | B60R 21/2338 |
| 2019/0071046 A1* | 3/2019 | Dry | B60R 21/233 |
| 2019/0248322 A1* | 8/2019 | Herzenstiel | B60R 21/207 |
| 2020/0391690 A1* | 12/2020 | Faruque | B60R 21/233 |
| 2021/0009068 A1 | 1/2021 | Farooq et al. | |
| 2021/0039578 A1* | 2/2021 | Rupp | B60R 21/207 |
| 2021/0061211 A1* | 3/2021 | Jung | B60R 21/26 |

FOREIGN PATENT DOCUMENTS

| | | | | |
|---|---|---|---|---|
| EP | 3521110 A1 * | 8/2019 | ......... | B60R 21/207 |
| JP | 2007230395 A * | 9/2007 | ......... | B60R 21/207 |
| JP | 2008081002 A | 4/2008 | | |

* cited by examiner

*Primary Examiner* — Drew J Brown
(74) *Attorney, Agent, or Firm* — Frank A. MacKenzie; Bejin Bieneman PLC

(57) ABSTRACT

A vehicle seat includes a seatback defining an occupant seating area and an airbag mounted to the seatback. The airbag has a top chamber inflatable above the occupant seating area and elongated from the seatback in a seat-forward direction. The airbag has two side chambers inflatable downwardly from the top chamber on opposite sides of the occupant seating area. The top chamber has a plurality of tubular segments each elongated in the seat-forward direction and disposed in a cross-seat direction relative to each other.

16 Claims, 7 Drawing Sheets

OVERHEAD SEAT-MOUNTED AIRBAG

BACKGROUND

Vehicles are equipped with airbag assemblies that include an airbag and an inflator. In the event of a vehicle impact, the inflator activates and provides inflation medium to the airbag. This pressurizes the airbag to control the kinematics of an occupant during the vehicle impact. The airbag assemblies may be located at various positions in passenger compartment of the vehicle. Vehicles may include airbags supported on a dash, side air curtains mounted to roof rails, seat-mounted airbag, etc.

DETAILED DESCRIPTION

Figure 1:
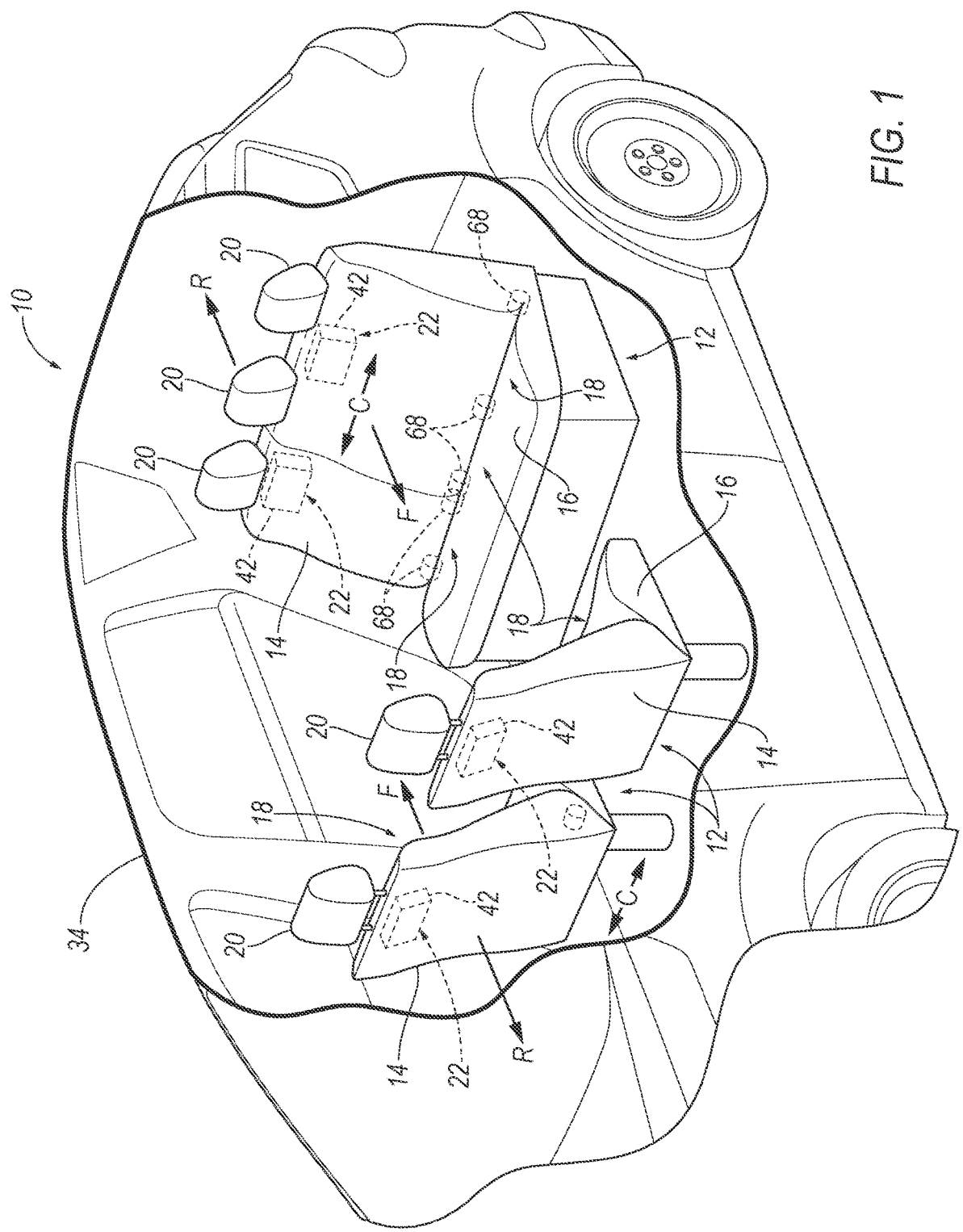
FIG. 1 is a cut-away view of a vehicle to show several seats and corresponding airbag assemblies.

A vehicle seat includes a seatback defining an occupant seating area and an airbag mounted to the seatback. The airbag has a top chamber inflatable above the occupant seating area and elongated from the seatback in a seat-forward direction. The airbag has two side chambers inflatable downwardly from the top chamber on opposite sides of the occupant seating area. The top chamber has a plurality of tubular segments each elongated in the seat-forward direction and disposed in a cross-seat direction relative to each other.

The tubular segments may be fluidly connected to each other. The side chambers may be fluidly isolated from the top chamber.

The vehicle seat may include an inflator supported on the seatback and including fill tubes in fluid communication with the top chamber and the side chambers.

The top chamber may have an upper panel, a lower panel connected to the upper panel at an outer perimeter, and connections elongated in the seat-forward direction and connecting the upper panel and the lower panel defining the tubular segments. The connections may be fluidly impervious and a plurality of the connections may be aligned with each other in the cross-vehicle direction and spaced from each other in the seat-forward direction to allow fluid flow therebetween. The connections may include stitching directly connecting the upper panel and the lower panel.

The tubular segments may be generally circular in cross-section.

The tubular segments may extend from the seatback to a terminus of the top chamber distal to the seatback.

The vehicle seat may include a seat bottom and a tether connecting a first one of the side chambers to the seat bottom. The vehicle seat may include a tether retractor fixed to the seat bottom and operatively connected to the tether. The vehicle seat may include a second tether connecting a second one of the side chambers to the seat bottom and a second tether retractor fixed to the seat bottom and connected to the second tether, the tether retractor and the second tether retractor being on opposite sides of the occupant seating area. The tether may be connected to a lowest portion of the first one of the side chambers and the second tether may be connected to a lowest portion of the first one of the side chambers. The side chambers may each include a top edge abutting the top chamber and a bottom edge, the tether being connected to the bottom edge of the first one of the side chambers and the second tether being connected to the bottom edge of the second one of the side chambers. Each bottom edge may include a front edge extending and in a seat-rearward direction and a rear edge extending downward and in the seat-forward direction, the front edge and the rear edge meeting at a lowest portion of the side chamber, the tether being connected to lowest portion of the first one of the side chambers and the second tether being connected to the lowest portion of the second one of the side chambers. The tether retractor may be pyrotechnically activated.

The vehicle seat may include a head restraint, the airbag being inflatable from the seatback from between the head restraint and the occupant seating area.

The vehicle seat may include an inflator supported on the seatback and including fill tubes in fluid communication with the top chamber and the side chambers.

The seatback may define a second occupant seating area, the top chamber being inflatable above the second occupant seating area, and the airbag has a third side chamber inflatable downwardly from the top chamber.

With reference to the figures, wherein like numerals indicate like elements, a seat 12 includes a seatback 14 defining an occupant seating area 18 and an airbag 24 mounted to the seatback 14. The airbag 24 has a top chamber 26 inflatable above the occupant seating area 18 and elongated from the seatback 14 in a seat-forward direction F. The airbag 24 has two side chambers 28 inflatable downwardly from the top chamber 26 on opposite sides of the occupant seating area 18. The top chamber 26 has a plurality of tubular segments 30 each elongated in the seat-forward direction F and disposed in a cross-seat direction C relative to each other.

Since the tubular segments 30 are elongated in the seat-forward direction F, the tubular segments 30 direct inflation of the airbag 24 in in the seat-forward direction F and also maintains the shape of the airbag 24 to deploy above the occupant seating area 18 between the occupant seating area 18 and a roof 34 of the vehicle 10. Specifically, the tubular segments 30 shape the airbag 24 to have a relatively thin profile to fit between the occupant seating area 18 and the roof 34. The side chambers 28 control the kinematics of an occupant of the seat 12 during impacts that urge the occupant in the cross-seat direction C. The side chambers 28 may separate the occupant from adjacent occupants and/or vehicle 10 components. The side chambers 28 may reduce movement an unbelted occupant of the seat 12. Since the airbag 24 is mounted to the seatback 14, the airbag 24 moves with the seatback 14. As an example, the seat 12 may be rotatable, as described further below, and in such an example, the airbag 24 rotates with the seat 12.

A vehicle 10 may be any suitable type of ground automobile, e.g., a passenger or commercial automobile such as a sedan, a coupe, a truck, a sport utility, a crossover, a van, a minivan, a taxi, a bus, etc.

The seat 12 includes the seatback 14 and a seat bottom 16. The seatback 14 may be supported by the seat bottom 16 and may be stationary or movable relative to the seat bottom 16. The seatback 14 and the seat bottom 16 may be adjustable in multiple degrees of freedom. Specifically, the seatback 14 and the seat bottom 16 may themselves be adjustable, in other words, adjustable components within the seatback 14 and/or the seat bottom 16, and/or may be adjustable relative to each other. The seatback 14 may include a seatback frame (not numbered) and a covering (not numbered) supported on the seatback frame. The seatback frame may include tubes, beams, etc. Specifically, the seatback frame includes a pair of upright frame members. The upright frame members are elongated, and specifically, are elongated in a generally upright direction when the seatback 14 is in a generally upright position. The upright frame members are spaced from each other and the seatback frame includes cross-members extending between the upright frame members. The seatback frame, including the upright frame members, may be of any suitable plastic material, e.g., carbon fiber reinforced plastic (CFRP), glass fiber-reinforced semi-finished thermoplastic composite (organosheet), etc. As another example, some or all components of the seatback frame may be formed of a suitable metal, e.g., steel, aluminum, etc. The covering may include upholstery and padding. The upholstery may be cloth, leather, faux leather, or any other suitable material. The upholstery may be stitched in panels around the frame. The padding may be between the covering and the seatback 14 frame and may be foam or any other suitable material.

The seat 12 includes a head restraint 20 supported on the seatback 14. The head restraint 20 extends upwardly from the seatback 14 and the position of the head restraint 20 may be adjusted relative to the seatback 14. The airbag 24 is inflatable from the seatback 14 from between the head restraint 20 and the occupant seating area 18.

The seat 12 defines the occupant seating area 18. Specifically, the seatback 14 at least in part defines the occupant seating area 18. The occupant seating area 18 is the area occupied by an occupant when seated on the seat bottom 16. The occupant seating area 18 is in a seat-forward direction F of the seatback 14 and above the seat bottom 16.

The vehicle 10 includes an airbag assembly 22. The airbag assembly 22 includes the airbag 24 and an inflator 32. The airbag assembly 22 may include an airbag housing 42. The inflator 32 inflates the airbag 24 to an inflated position, as described further below.

The vehicle 10 may include any suitable number of airbag assemblies 22. For example, a seat 12 that supports a single occupant may include one airbag assembly 22. As another example, a seat 12 that supports more than one occupant may include more than one airbag assembly 22. Each airbag assembly 22 may be devoted to a single occupant or to multiple occupants. In the example shown in FIG. 1, the vehicle 10 includes four airbag assemblies 22. For example, two of the seats 12, specifically two seats 12 that are bucket seats 12 for individual occupants and are rotatable to face different directions, each include one airbag assembly 22. As another example, another one of the seats 12 is a bench seat 12 and includes two airbag assemblies 22. In that example, one of the airbag assemblies 22 accommodates two occupants, as described further below, and the other airbag assembly 22 is devoted to one occupant.

In an example in which the airbag assembly 22 includes the airbag housing 42, the airbag 24 is supported by the airbag housing 42. The airbag housing 42 houses the airbag 24 in an uninflated position and supports the airbag 24 in the inflated position. The airbag 24 may be rolled and/or folded to fit within the airbag housing 42 in the uninflated position. The airbag housing 42 may be of any suitable material, e.g., a rigid polymer, a metal, a composite, or a combination of rigid materials.

The airbag 24 is mounted to the seatback 14. Specifically, the airbag 24 is mounted to the seatback frame, for example, the cross-member. In the example in which the airbag assembly 22 includes the airbag housing 42, the airbag housing 42 may be mounted to the seatback frame, e.g., with clips, fasteners, etc. The airbag 24 is inflatable from the seatback 14 from between the head restraint 20 and the occupant seating area 18.

The airbag 24, e.g., the top chamber 26, side chambers 28, tethers 62, etc., may be fabric, e.g., a woven polymer. As an example, the airbag 24 may be woven nylon yarn, for example, nylon 6, 6. Other examples of woven polymers include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 2:
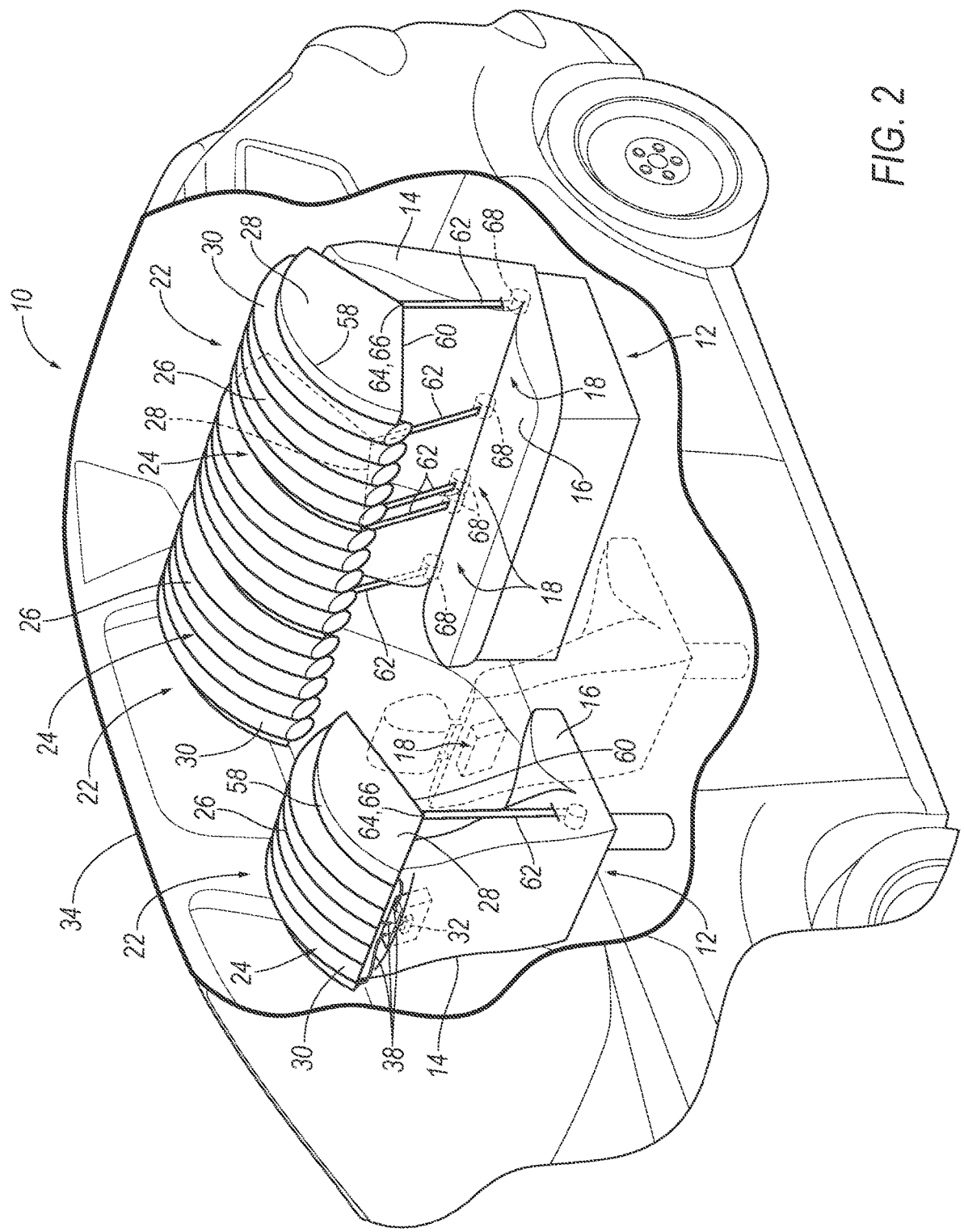
FIG. 2 is the cut-away view of FIG. 1 with the airbag assemblies in a first stage of deployment and with one of the seats shown in broken lines so as to illustrate other components.

The inflator 32 is supported on the seatback 14 and is in fluid communication with the airbag 24. Specifically, the inflator 32 is in fluid communication with the top chamber 26 and the side chambers 28. The inflator 32 expands the airbag 24 with inflation medium, such as a gas, to move the airbag 24 from the uninflated position to the inflated position. The inflator 32 may be supported by any suitable component. For example, the inflator 32 may be supported by the airbag housing 42. The inflator 32 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 32 may be connected to the airbag 24 through fill tubes, diffusers, etc. The inflator 32 may be separately connected to the top chamber 26 and each of the side chambers 28. For example, the inflator 32 may include a fill tube 38 for each of the side chambers 28 and the top chamber 26, respectively. FIG. 2 shows one example of three fill tubes 38 that provide inflation medium to the side chambers 28 and the top chamber 26, respectively.

As set forth above the airbag 24 has the top chamber 26 and at least two side chambers 28. The top chamber 26 is inflatable above the occupant seating area 18 and elongated from the seatback 14 in the seat-forward direction F. In other words, the longest dimension of the top chamber 26 is in a direction away from the seatback 14. The two side chambers 28 are inflatable downwardly from the top chamber 26 on opposite sides of the occupant seating area 18. The top chamber 26 is above the occupant seating area 18 and the side chambers 28 are on opposite sides of the occupant seating area 18 in the inflated position. Accordingly, an occupant in the occupant seating area 18 is enclosed by the seatback 14 the top chamber 26 and the side chambers 28 when the airbag 24 is in the inflated position. As set forth below, a tether retractor 68 68 pulls the airbag 24 around the occupant. The top chamber 26, specifically, may extend from a top-most edge of the seatback 14 in the inflated position, e.g., between the top-most edge and the head restraint 20.

The side chambers 28 may be fluidly isolated from each other and from the top chamber 26. In other words, inflation medium from the inflator 32 may not cross from one of the side chambers 28 to the top chamber 26 or from the top chamber 26 to either side chamber 28. For example, as set forth above, the inflator 32 may be separately connected each of the side chambers 28 and the top chamber 26.

The top chamber 26 may have a plurality of tubular segments 30 each elongated in the seat-forward direction F. The tubular segments 30 are disposed in the cross-seat direction C relative to each other. Specifically, the tubular segments 30 may be arranged in a line along the cross-seat direction C.

Figure 4:
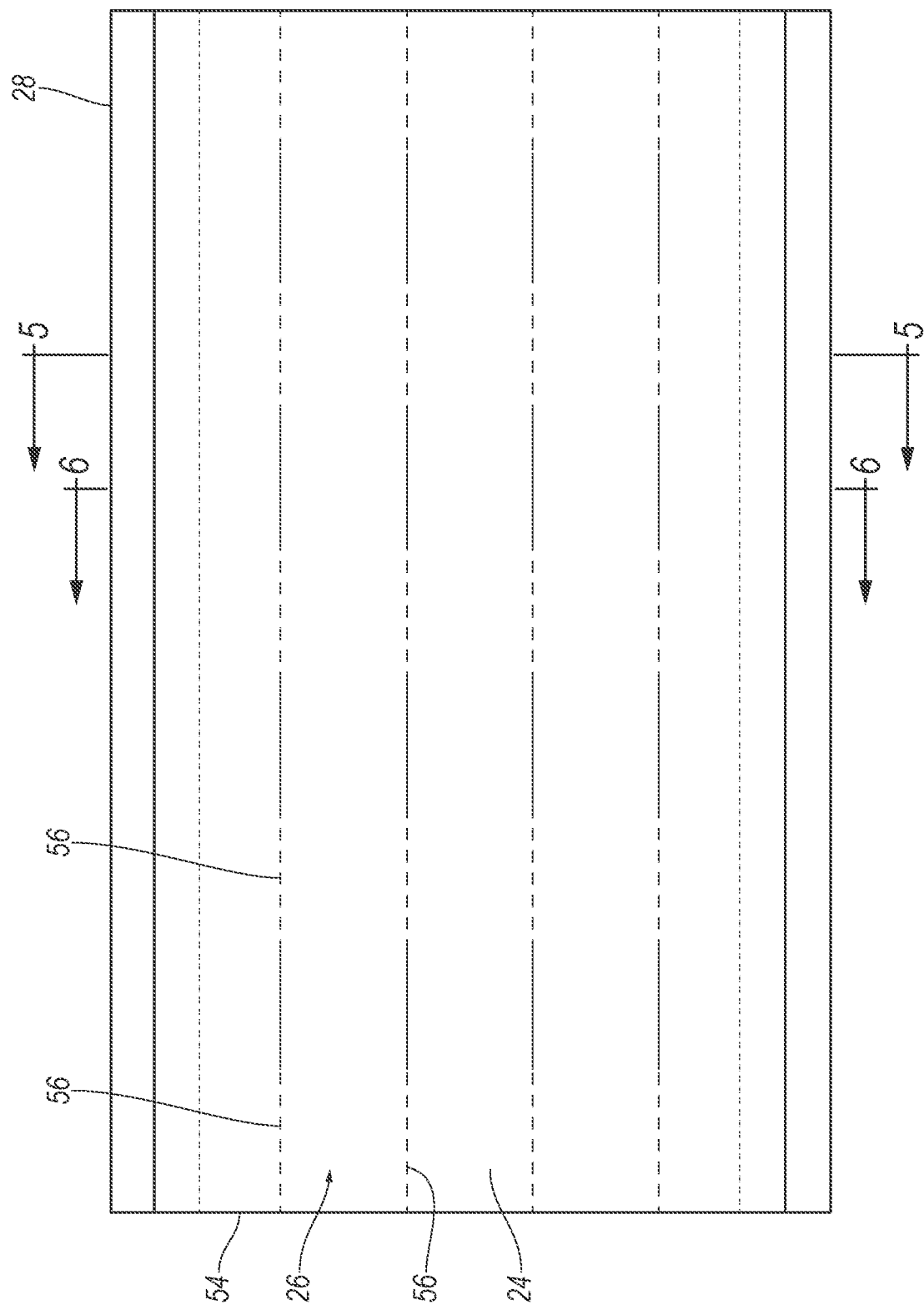
FIG. 4 is a plan view of an airbag of the airbag assembly in the first stage of deployment.
Figure 6:
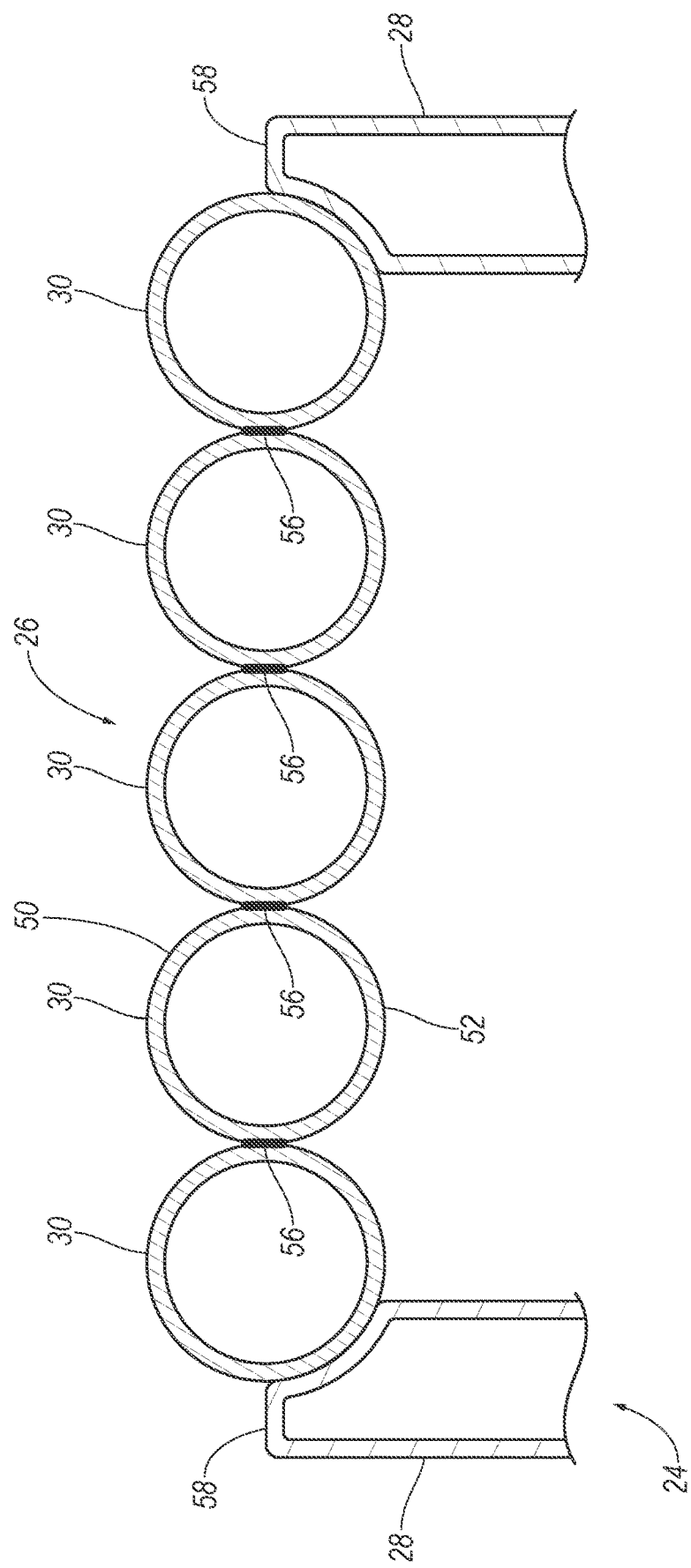
FIG. 6 is a cross-sectional view through line 6 of FIG. 4.
Figure 7:
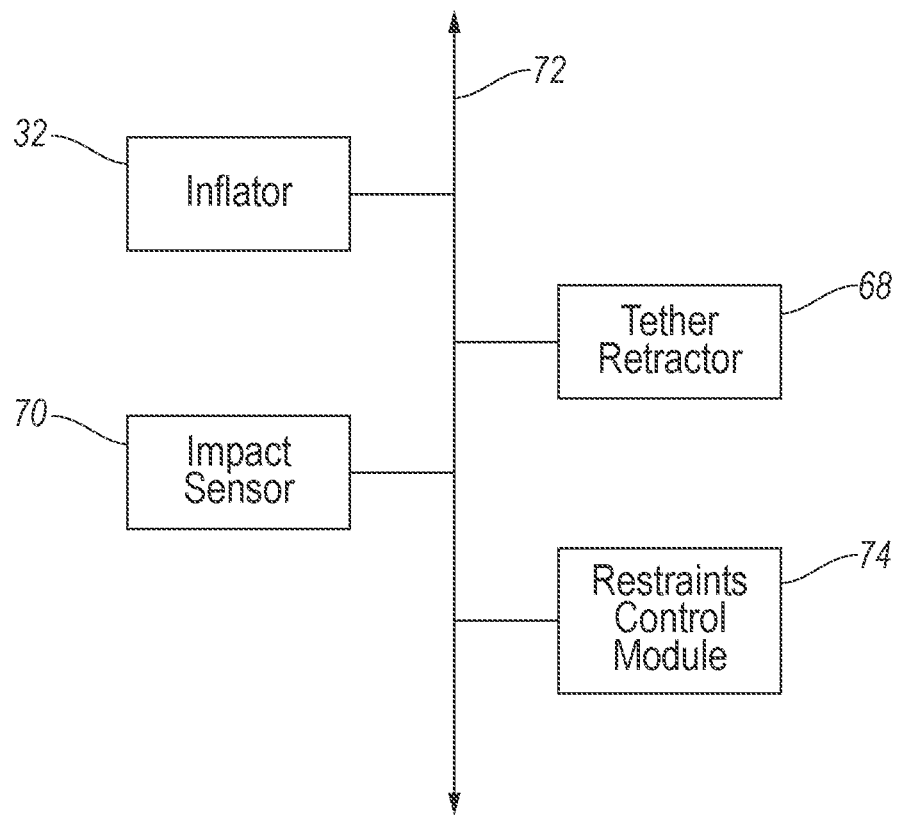
FIG. 7 is a block diagram of an example system of the vehicle.

The top chamber 26 has an upper panel 50 and a lower panel 52 connected to the upper panel 50 at an outer perimeter 54 of the top chamber 26. In the inflated position, the upper panel 50 is above the lower panel 52 and, specifically, the lower panel 52 is between the upper panel 50 and occupant seating area 18. The top chamber 26 includes connections 56 elongated in the seat-forward direction F and connecting the upper panel 50 and the lower panel 52 defining the tubular segments 30. The connections 56 may be, for example, stitching, ultrasonic welding, adhesive, etc. Specifically, the connections 56 may directly connect the upper panel 50 and the lower panel 52, e.g., as one example, stitching directly connecting the upper panel 50 and the lower panel 52. The connections 56 may be fluidly impervious. In other words, fluid, such as the inflation medium, cannot pass from one tubular segment 30 to the other tubular segment 30 through the connections 56. The connections 56 are shown, for example, as stitches in FIG. 4 and are shown in the cross-sectional view of FIG. 6.

Figure 5:
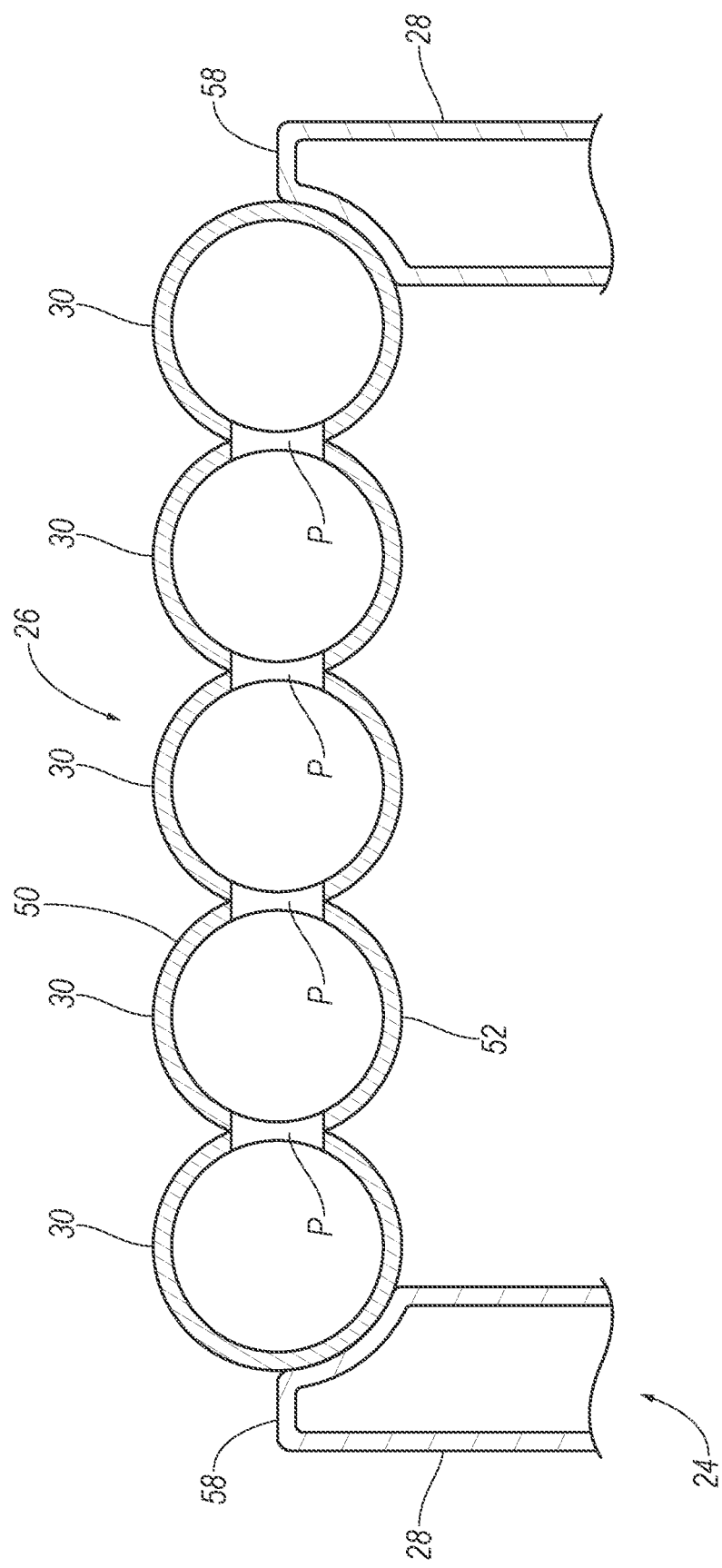
FIG. 5 is a cross-sectional view through line 5 of FIG. 4.

The tubular segments 30 may be fluidly connected to each other. Accordingly, inflation medium from the inflator 32 flows between adjacent tubular segments 30. In such an example, one of tubular segments 30 (or a number greater than one of the tubular segments 30 and less than all of the tubular segments 30) may be directly inflated with inflation medium and the inflation medium may flow from that tubular segments 30 to the other tubular segments 30. As an example, multiple connections 56 may be between adjacent tubular segments 30 and, in such an example, the connections 56 may be spaced from each other in the seat-forward direction F to allow for fluid flow therebetween. In such an example, a plurality of the connections 56 (i.e., connections 56 between several or all of the tubular segments 30) may be aligned with each other in the cross-vehicle 10 direction. This creates fluid paths P for uninterrupted fluid flow therebetween the tubular segments 30. The fluid paths P are shown in the cross-sectional view of FIG. 5.

The tubular segments 30 may be elongated from the seatback 14 in the seat-forward direction F. The tubular segments 30 extend from the seatback 14 to a terminus of the top chamber 26 distal to the seatback 14.

The tubular segments 30 are generally circular in cross-section. In the example shown in the figures, the tubular segments 30 are generally cylindrical, specifically curved cylinders.

The side chambers 28 are inflatable downwardly from the top chamber 26 on opposite sides of the occupant seating area 18. In other words, the occupant seating area 18 is between the side chambers 28 when the airbag 24 is inflated. Accordingly, the side chambers 28 are on opposite sides of the occupant in the occupant seating area 18.

The side chambers 28 each include a top edge 58 abutting the top chamber 26 and a bottom edge 60 distal to the top chamber 26. The bottom edge 60 is peak 64ed, and specifically includes a peak 64 spaced from the top edge 58. For example, the bottom edge 60 is V-shaped. The bottom edge 60, more specifically, includes a forward edge extending downward and in a seat-rearward direction and a rearward edge extending downward and in the seat-forward direction F. The forward edge and the rearward edge meet at a lowest portion 66 of the side chamber 28. Specifically, the peak 64 is at the lowest portion 66 of the side chamber 28.

The airbag assembly 22 may include at least one tether 62 connecting the airbag 24 to the seat 12. In the example shown in the figures, the airbag assembly 22 includes a plurality of tethers 62. As set forth below, the tethers 62 may be retracted to pull the airbag 24 from a first stage of deployment to a second stage of deployment.

The tether 62 may connect the airbag 24 to the seat bottom 16. Specifically, for example, the tether 62 may connect the side chamber 28 to the seat bottom 16. In the example shown in the figures, the airbag assembly 22 may include tethers 62 to connect each side chamber 28 to the seat bottom 16. The tether 62 may connect the bottom edge 60 of the airbag 24 to the seat bottom 16. Specifically, the tether 62 may be connected to the lowest portion 66 of the side chamber 28, e.g., at the peak 64.

The seat 12 includes a tether retractor 68 fixed to the seat bottom 16 and operatively connected to the tether 62. Specifically, when the tether retractor 68 is actuated, the tether retractor 68 pulls the tether 62, e.g., retracts the tether 62, downwardly to pull the airbag 24 downwardly toward the seat bottom 16. The tether 66 is connected to the tether retractor 68 such that the tether retractor 68 retracts the tether 66 to pull the airbag 24 when the tether retractor 68 is actuated. The seat 12 may include a tether retractor 68 for each tether 62.

Figure 3:
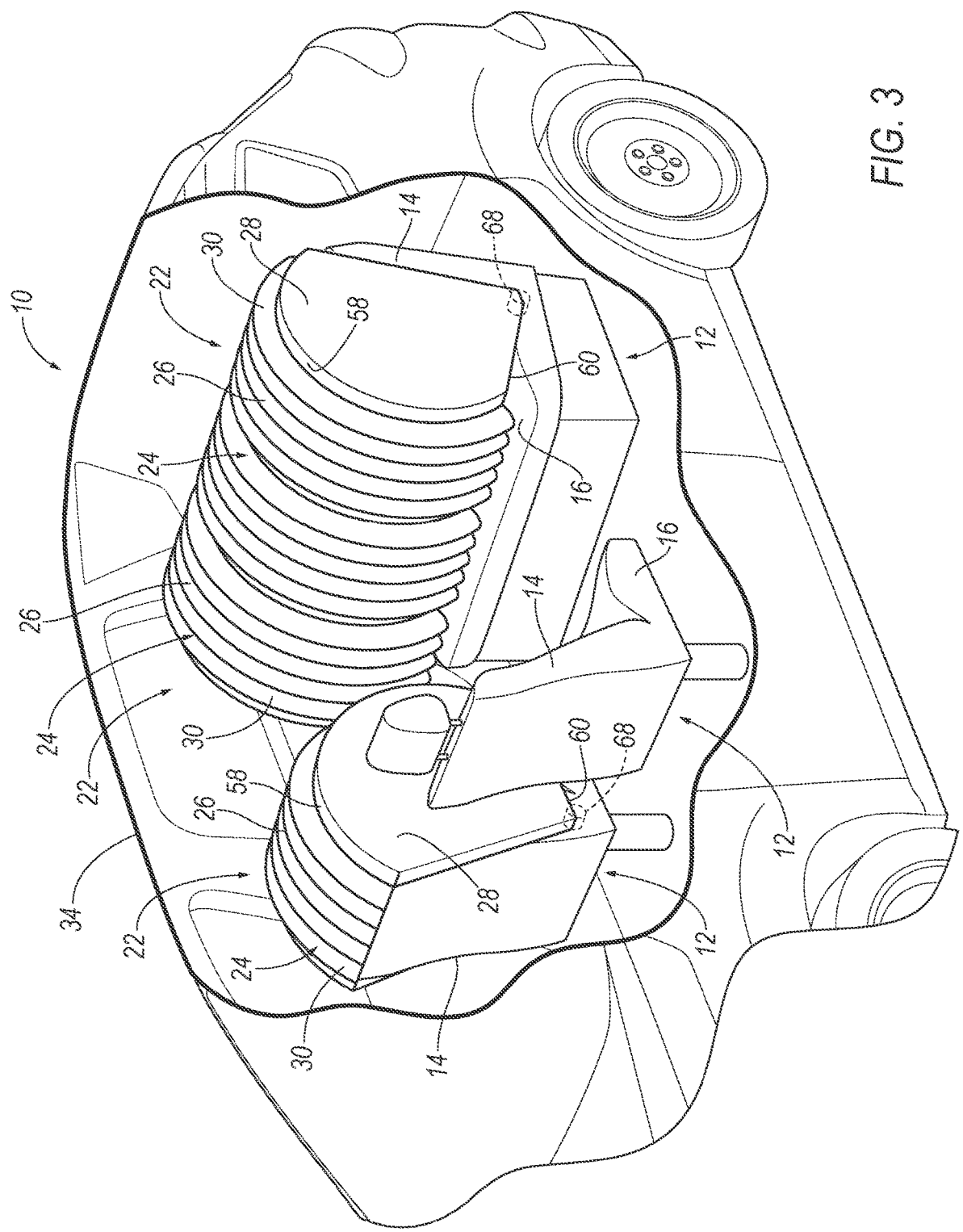
FIG. 3 is the cut-away view of FIG. 2 with the airbag assemblies in a second stage of deployment.

During deployment in response to a vehicle impact, the tether retractor 68 may be activated after the airbag 24 is inflated. Accordingly, in the first stage of deployment, the inflator 32 supplies inflation medium to the airbag 24 and the airbag 24 deploys away from the seatback 14 in the seat-forward direction F, as shown in FIG. 2. In a second stage of deployment, the tether retractor 68 is activated to pull the airbag 24 downwardly toward the seat bottom 16, as shown in FIG. 3.

As an example, the tether retractor 68 may be pyrotechnically activated, i.e., activated by a pyrotechnic charge. In such an example, the tether retractor 68 includes may be a rotary actuator (as shown in the figures) or a linear actuator. In an example in which the tether retractor 68 is a rotary actuator, the pyrotechnic charge rotates a shaft connected to the tether 62 such that the tether 62 wraps around the shaft; a piston linkage, in which the pyrotechnic charge for example, drives a piston attached to the tether 62; a ball-in-tube linkage, in which an pyrotechnic charge propels a ball or balls over a cogwheel connected to the tether 62; a mechanical linkage, in which a compressed spring attached to the tether 62 is released; or any other suitable type.

The pyrotechnic charge may be combustible to produce a gas. The pyrotechnic charge may be formed of a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$).

As set forth above, each airbag assembly 22 may be devoted to a single occupant or to multiple occupants. As an example, one of the seats 12 in FIGS. 1-3 supports three occupants. In the event the seat 12 supports multiple occupants, one of the airbag assemblies 22 may accommodate multiple occupants. In such an example, the seat 12 may include multiple airbag assemblies 22 or a single airbag assembly 22 that accommodates the multiple occupants. In the example, shown in FIGS. 1-3, the seat 12 accommodates three occupants and includes one airbag assembly 22 that accommodates two occupants and another airbag assembly 22 that accommodates one occupant. In other examples, the seat 12 accommodating three occupants may include three airbag assemblies 22, i.e., one for each occupant, or may include a single airbag assembly 22, i.e., one that accommodates all occupants.

In the example shown in FIGS. 1-3, the airbag assembly 22 accommodating multiple occupants includes more than two side chambers 28. Specifically, the airbag assembly 22 includes an additional side chamber 28 between two other side chambers 28 to separate occupants. In such an example, tethers 62 and tether retractor 68s may be on opposite sides of the he occupant seating area. Specifically, this third side chamber 28 is inflatable between two occupant seating areas 18.

The vehicle 10 may include a computer having a processor and a memory storing instructions executable by the processor to deploy the airbag 24. The computer may be, for example, a restraints control module 74. Use of "in response to," "based on," and "upon determining" herein indicates a causal relationship, not merely a temporal relationship.

The computer is programmed to actuate the inflator 32 and to actuate the tether retractor 68. Specifically, the computer is programmed to delay actuation of the tether retractor 68 until after the inflator 32 is actuated. In other words, the computer is programmed to, in the first stage of deployment, the actuate the inflator 32 to inflation medium to the airbag 24 and subsequently actuate the tether retractor 68 to pull the airbag 24 downwardly in the second stage of deployment. The delay between actuation of the inflator 32 and the actuation of the tether retractor 68 may be, for example, 20-50 ms.

The vehicle 10 may include at least one impact sensor 70 for sensing impact of the vehicle 10. The impact sensor 70 is in communication with the computer. The computer may activate the inflator 32, e.g., provide an impulse to a pyrotechnic charge of the inflator 32 when the impact sensor 70 senses an impact of the vehicle 10. Alternatively or additionally to sensing impact, the impact sensor 70 may be configured to sense impact prior to impact, i.e., pre-impact sensing. The impact sensor 70 is configured to detect an impact to the vehicle 10. The impact sensor 70 may be of any suitable type, for example, post-contact sensors such as accelerometers, pressure sensors, and contact switches; and pre-impact sensors 70 such as radar, LIDAR, and vision-sensing systems. The vision-sensing systems may include one or more cameras, CCD image sensors, CMOS image sensors, etc. The impact sensor 70 may be located at numerous points in or on the vehicle 10.

The computer is an example storage medium. Storage medium may be any non-transitory computer-readable storage medium or machine-readable storage medium, such as an optical, magnetic or semiconductor storage medium. In various implementations, storage medium may be an article of manufacture. In some implementations, storage medium may store computer-executable instructions, such as computer-executable instructions to implement logic flow. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

The vehicle 10 includes a communication network 72 that can include a bus in the vehicle 10 such as a controller area network (CAN) or the like, and/or other wired and/or wireless mechanisms. Via the vehicle 10 network, the computer may transmit messages to various devices in the vehicle 10 and/or receive messages (e.g., CAN messages) from the various devices, e.g., sensors, an actuator, a human machine interface (HMI), etc. Alternatively or additionally, in cases where the computer actually comprises a plurality of devices, the vehicle 10 communication network 72 may be used for communications between devices represented as the computer in this disclosure. Further, as mentioned below, various controllers and/or sensors may provide data to the computer via the vehicle 10 communication network 72.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle seat comprising:
a seatback defining an occupant seating area; and
an airbag mounted to the seatback;
the airbag having a top chamber inflatable above the occupant seating area and elongated from the seatback in a seat-forward direction;
the airbag having two side chambers inflatable downwardly from the top chamber on opposite sides of the occupant seating area;
the top chamber having a plurality of tubular segments each elongated in the seat-forward direction and disposed in a cross-seat direction relative to each other;
the top chamber having an upper panel, a lower panel connected to the upper panel at an outer perimeter, and connections elongated in the seat-forward direction, the connections connecting the upper panel and the lower panel defining the tubular segments;
the connections being fluidly impervious and a plurality of the connections being aligned with each other in the cross-seat direction and spaced from each other in the seat-forward direction to allow fluid flow therebetween.

2. The vehicle seat as set forth in claim 1, wherein the side chambers are fluidly isolated from the top chamber.

3. The vehicle seat as set forth in claim 2, further comprising an inflator supported on the seatback and including fill tubes in fluid communication with the top chamber and the side chambers.

4. The vehicle seat as set forth in claim 1, wherein the connections include stitching directly connecting the upper panel and the lower panel.

5. The vehicle seat as set forth in claim 1, wherein the tubular segments are generally circular in cross-section.

6. The vehicle seat as set forth in claim 1, wherein the tubular segments extend from the seatback to a terminus of the top chamber distal to the seatback.

7. The vehicle seat as set forth in claim 1, further comprising a seat bottom and a tether connecting a first one of the side chambers to the seat bottom.

8. The vehicle seat as set forth in claim 7, further comprising a tether retractor fixed to the seat bottom and operatively connected to the tether.

9. The vehicle seat as set forth in claim 8, further comprising a second tether connecting a second one of the side chambers to the seat bottom and a second tether retractor fixed to the seat bottom and connected to the second tether, the tether retractor and the second tether retractor being on opposite sides of the occupant seating area.

10. The vehicle seat as set forth in claim 9, wherein the tether is connected to a lowest portion of the first one of the side chambers and the second tether is connected to a lowest portion of the first one of the side chambers.

11. The vehicle seat as set forth in claim 9, wherein the side chambers each include a top edge abutting the top chamber and a bottom edge, the tether being connected to the bottom edge of the first one of the side chambers and the second tether being connected to the bottom edge of the second one of the side chambers.

12. The vehicle seat as set forth in claim 11, wherein each bottom edge includes a front edge extending downward and in a seat-rearward direction and a rear edge extending downward and in the seat-forward direction, the front edge and the rear edge meeting at a lowest portion of the side chamber, the tether being connected to lowest portion of the first one of the side chambers and the second tether being connected to the lowest portion of the second one of the side chambers.

13. The vehicle seat as set forth in claim 8, wherein the tether retractor is pyrotechnically activated.

14. The vehicle seat as set forth in claim 1, further comprising a head restraint, the airbag being inflatable from the seatback from between the head restraint and the occupant seating area.

15. The vehicle seat as set forth in claim 1, further comprising an inflator supported on the seatback and including fill tubes in fluid communication with the top chamber and the side chambers.

16. The vehicle seat as set forth in claim 1, wherein the seatback defines a second occupant seating area, the top chamber being inflatable above the second occupant seating area, and the airbag has a third side chamber inflatable downwardly from the top chamber.

* * * * *